C. R. TWITCHELL.
PRESSURE GAGE.
APPLICATION FILED APR. 26, 1911.
1,048,237. Patented Dec. 24, 1912.
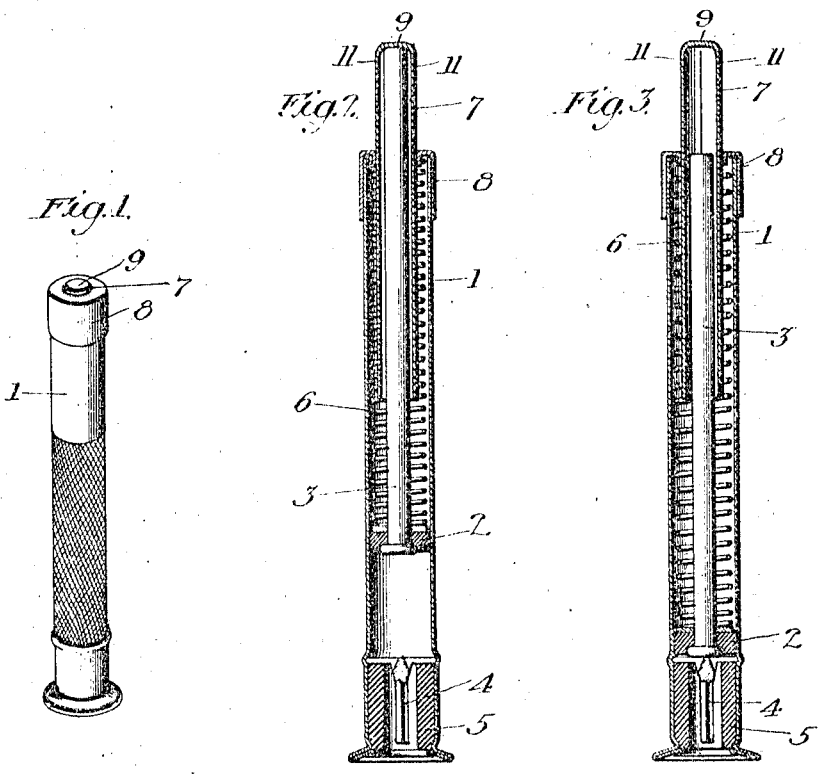
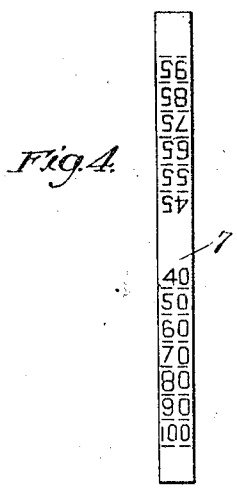
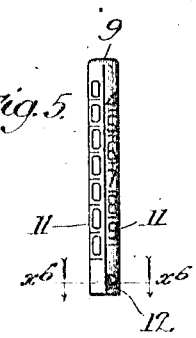
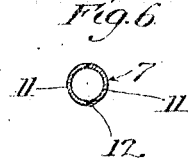
Witnesses:
Inventor:
Charles R. Twitchell

UNITED STATES PATENT OFFICE.

CHARLES R. TWITCHELL, OF LOS ANGELES, CALIFORNIA, ASSIGNOR, BY MESNE ASSIGNMENTS, TO A. SCHRADER'S SON, INCORPORATED, OF NEW YORK, N. Y., A CORPORATION OF NEW YORK.

PRESSURE-GAGE.

1,048,237. Specification of Letters Patent. Patented Dec. 24, 1912.

Application filed April 26, 1911. Serial No. 623,452.

*To all whom it may concern:*

Be it known that I, CHARLES R. TWITCHELL, a citizen of the United States, residing at Los Angeles, in the county of Los Angeles and State of California, have invented new and useful Improvements in Pressure-Gages, of which the following is a specification.

This invention relates to pressure gages, particularly to improvements over a former patent of mine No. 927,298, dated July 6th, 1909. In my said former patent I have shown a pressure gage adapted to be applied to the valve of a pneumatic tire for determining the pressure of air in the tire, the gage consisting of a tube with a plunger therein and a gage-bar carried by the plunger and adapted to be projected through the end of the tube a distance corresponding to the distance the plunger is moved outward by the pressure of air from within the tire, the outward movement of the plunger being resisted by a coil spring. In this former construction when the instrument was removed from the valve of the tire and the pressure relieved, the spring acted to restore the piston and gage-bar to normal retracted position, making it necessary to read the scale on the gage-bar during the time that it was in extended position, and as this only happened when the instrument was held in place on the valve of the tire, it was more or less difficult to determine the pressure, and especially so in the dark or when the valve of the tire was at a low point.

The object of the present invention is to overcome these disadvantages by providing a self-registering device whereby the self-registering device will be moved into indicating position by the piston rod and will be maintained in such indicating position after the piston and piston rod have been restored to normal position, thus making it an easy matter to determine the pressure. the gage after having been applied to the valve can be removed therefrom and held in a convenient position while being examined, or if in the dark it can be carried to the light and read.

Referring to the drawings:—Figure 1 is a perspective view of the device. Fig. 2 is a longitudinal cross section, showing the piston rod and registering scale extended. Fig. 3 is a view similar to Fig. 2, showing the piston rod retracted, leaving the registering sleeve extended. Fig. 4 is a plan view of the sleeve before being formed. Fig. 5 is a front elevation of the sleeve after having been formed. Fig. 6 is a cross section on line $x^6$—$x^6$ Fig. 5.

1 designates the barrel, 2 the piston, 3 the piston rod, 4 the anvil, 5 the rubber gasket washer and 6 the spring, all of which may be of any preferred form of construction.

7 designates the registering sleeve which telescopes with the end of the piston rod 3 and is slidable in the guide cap 8 on the end of the barrel 1. The sleeve 7 fits loosely over the piston rod 3, but has a frictional bearing in the guide cap 8. Thus when the piston rod 3 is moved out by the piston 2 under the air pressure, the piston rod 3 pushes out the registering sleeve 7, and after the rod 3 has been retracted by the spring 6 the sleeve 7 will remain in extended position by reason of its frictional contact in the guide cap 8.

The registering sleeve 7 is provided with two sets of numerals, as shown in Figs. 4 and 5; one set designating pressure from 40 to 100 pounds per square inch, and the other set designating pressures half-way between the respective numerals of the first set, as 45 to 95 pounds per square inch.

I prefer to construct the sleeve 7 from a flat plate, as shown in Fig. 4, and to then form it into a cylindrical form, as shown in Fig. 5, which will leave an imperforate end portion 9, and the body portion of the sleeve will consist of two semi-cylindrical members 11 which have a tendency to spring apart from each other due to the connection across the end 9, and this outward pressure of the members 11 produces the requisite friction in the guide cap 8. In order to prevent the registering sleeve from being forced entirely through the guide cap, or from being accidentally removed manually, I form a slight projection or lip 12 near the lower end of one of the members 11 which acts as a stop to strike against the guide cap 8 and limit the outward movement of the registering sleeve. If it is necessary to withdraw the sleeve entirely from the barrel, this may be done by exerting sufficient force, as I intentionally form the lip 12 so that it will not project enough to positively prevent the withdrawal of the sleeve. Likewise the lip 12 being of an easy curve will permit of the registering sleeve being replaced within the barrel after having been withdrawn.

What I claim is:—

1. In a pressure gage, a barrel, a piston therein, a rod on the piston, a spring in the barrel opposing outward movement of the piston, a sleeve telescoping over the end of said rod and slidable within the barrel, said sleeve being resiliently expansible to frictionally slide in the barrel.

2. In a pressure gage, a barrel, a piston therein, a rod on the piston, a spring in the barrel opposing outward movement of the piston, a sleeve telescoping over the end of said rod and slidable within the barrel, said sleeve being resiliently expansible to frictionally slide in the barrel and having a projection formed in its lower end adapted to strike the end of the barrel and act as a stop limiting outward movement of the sleeve.

3. In a pressure gage, a barrel, means within the barrel and operating by air pressure to be extended from the barrel, a spring opposing outward movement of said means, a registering sleeve telescoping over said means and slidable within the barrel, a guide cap on the end of the barrel in which said sleeve slidably fits, said sleeve being formed from a single sheet metal strip, the strip being doubled on itself and the two members thereof curved laterally to form substantially semi-cylindrical members, each of said members being provided with a set of indicating numerals.

In testimony whereof, I have hereunto set my hand at Los Angeles, California, this 18th day of April, 1911.

CHARLES R. TWITCHELL.

In presence of—
G. T. HACKLEY,
FRANK L. A. GRAHAM.